April 14, 1970   J. D. THACKREY   3,506,377
BOLT CONTRUCTION
Filed Feb. 23, 1968
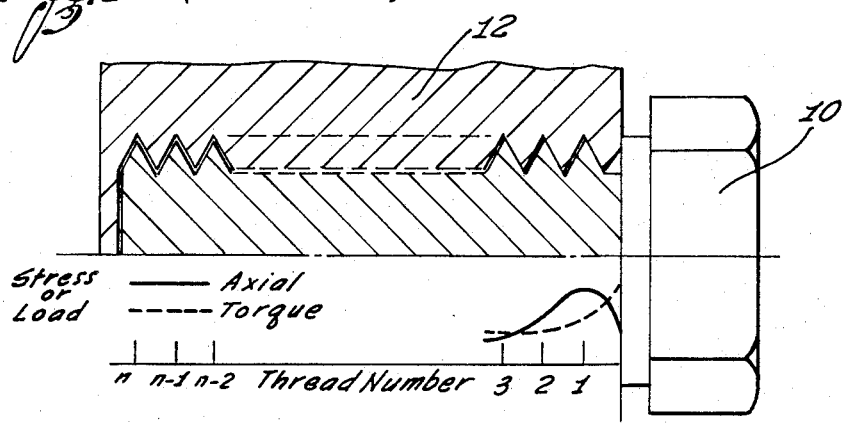
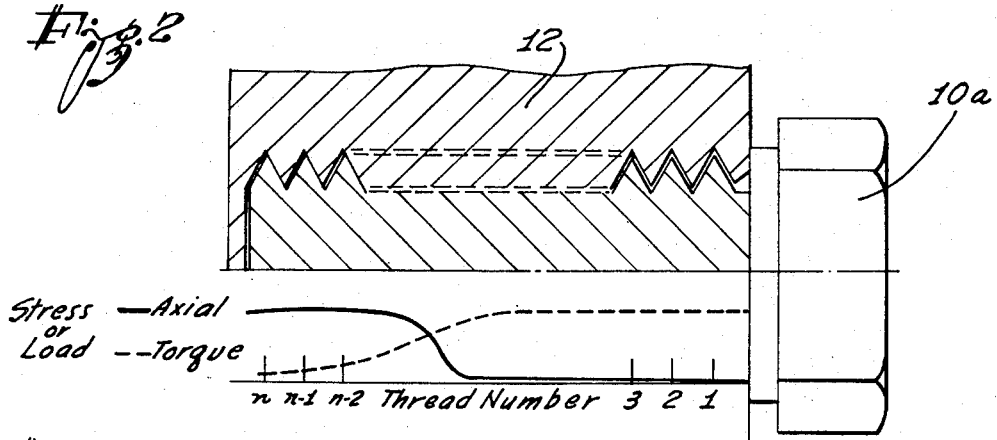
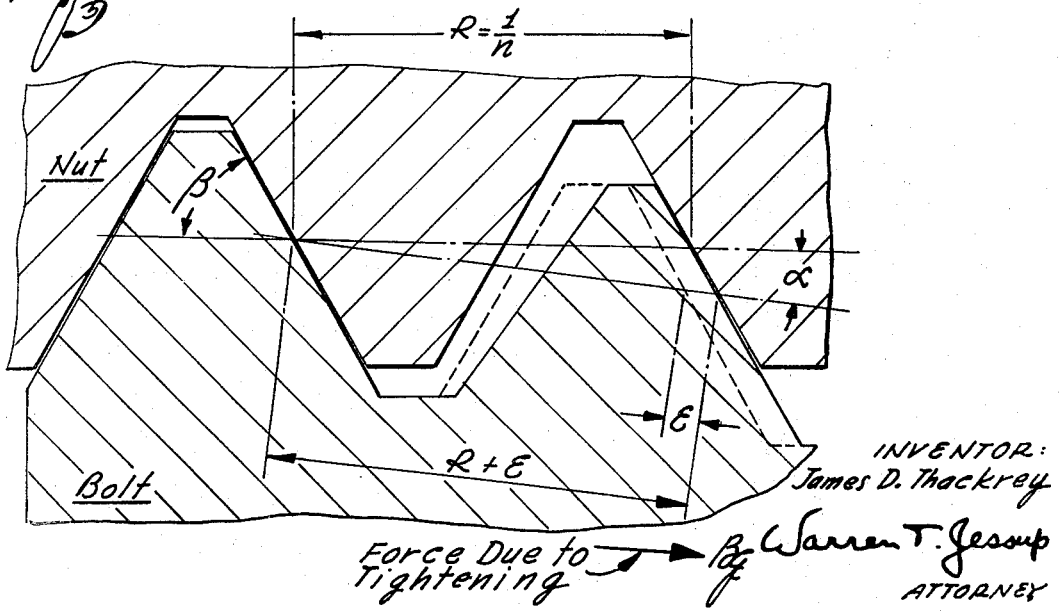
INVENTOR:
James D. Thackrey
By Warren T. Jesoup
ATTORNEY United States Patent Office 3,506,377
Patented Apr. 14, 1970

3,506,377
BOLT CONSTRUCTION
James D. Thackrey, 13852 Dall Lane,
Santa Ana, Calif. 92705
Filed Feb. 23, 1968, Ser. No. 707,766
Int. Cl. F16b 33/00, 35/00
U.S. Cl. 85—1                         3 Claims

ABSTRACT OF THE DISCLOSURE

An improved type of bolt is described in the following specification. The bolt to be described has a screw thread formed on a conical surface, so that the pitch line is slightly inclined with respect to the longitudinal axis of the bolt. This results in a bolt which, in use, has more resilience and longer fatigue life than the usual prior art bolt, and less tendency to loosen in the presence of vibrations.

BACKGROUND OF THE INVENTION

In recent years, a large amount of research has been directed to the basic screw thread of bolts, screws, and the like, in an attempt to increase the efficiency and reliability of threaded fasteners, especially those used in aircraft. As pointed out, for example, in an article in Products Engineering, May 8, 1967 entitled "New Asymmetric Thread . . . ," the fatigue life of high strength bolts is being extended by 20% or more by a simple change in the symmetry of the screw thread slope.

The aforesaid article also points out that in a conventional bolt, about half the load is carried by about one-third of the threads, those which lie closest to the nut face. This load distribution is stated to result from the elasticity which is inherent in the metal forming the bolt. Both the nut and the bolt originally have mating threads. However, the bolt stretches under the load and the nut compresses. This results in a mismatch of threads, with greater stress concentration on the more heavily loaded threads.

The asymmetrical bolt described in the aforesaid article is designed in an effort to distribute the load over more of the threads. As will be described, the improved bolt of the present invention also is constructed so that inherently the load may be distributed over a large number of the threads of the bolt. Additionally, in the improved bolt the length of stressed material is always as great as the geometrical space permits. This enhances the holding power of the assembled fastener.

As mentioned above, the improved bolt of the present invention has a thread which is formed on a conical surface, instead of being cut or rolled on a cylindrical surface, as is usually the case with the prior art bolts. The diameter of the conical surface increases as a function of the distance from the head of the bolt. The improved construction of the thread of the bolt of the present invention serves to control the tensile stress in the bolt shank or the bearing stress of the thread flanks in threaded fasteners. The threads can be designed to hold either stress essentially constant along the length of the bolt.

That is, the construction of the bolt of the present invention permits the distribution of the axial force over more threads of the bolt, and the bearing stress over more thread area for each thread, than is the case with the usual prior art bolts. This improved construction serves to overcome the aforesaid poor load distribution which is encountered when conventional bolts are used in threaded fasteners.

The improved thread construction of the bolt of the present invention also serves to predetermine the maximum bearing stress during "sliding" which unavoidably occurs when a bolt is tightened into its corresponding nut, thus reducing the tendency of the parts to gall during tightening. The improved bolt of the invention also exhibits high resilience in the threaded fastener assembly in which it is used so as to increase the fatigue life of the assembly; and to resist loosening of the bolt or nut in the presence of vibrations.

It will be appreciated that in the practice of the invention, the inclination of the pitch line of the bolt thread is effective only when the bolt is used in conjunction with a nut, or other female internally threaded member, when the latter has a conventional or "straight" thread. It will also be appreciated that the same result could be achieved by providing a reversed conical thread on the nut, and by using a conventional bolt with the usual "straight" thread.

BRIEF DESCRIPTION OF THE DRAWING

FIGURE 1 is a schematic representation of a usual prior art bolt with a straight thread threaded into a corresponding female member, and including a chart showing stress or load distribution along the teeth of the bolt;

FIGURE 2 is a schematic representation, like FIGURE 1, but with a bolt having a thread formed in accordance with the teaching of the invention; and FIGURE 3 is an enlarged fragmentary view, with respect to FIGURES 1 and 2, showing the relationship between the screw threads of a bolt constructed in accordance with the invention and a corresponding nut.

DESCRIPTION OF THE ILLUSTRATED EMBODIMENT

In the schematic representation of FIGURE 1, a usual prior art bolt 10 is threaded into a nut, or other internally threaded member 12. The bolt 10 in FIGURE 1 has the usual straight thread which is cut or rolled on a cylinder, so that the pitch line of the thread is actually parallel to the longitudinal axis of the bolt.

When the prior art bolt 10 is threaded into a nut 12, the nut having internal threads which, likewise, are cut or rolled on a cylindrical surface, the relationship between the threads of the bolt and the threads of the nut are as shown in FIGURE 1.

It will be observed from FIGURE 1 that only a few of the threads, that is, those closest to the head of the bolt, are actually loaded. This load distribution results because the first thread must deflect in order to load the second thread; and, in general, the "$n$th" thread of the bolt cannot bear on the corresponding nut thread, until the "$(n-1)$th" thread has borne on the nut thread, and has been deflected elastically, and has slipped in rotation enough to advance axially by the amount represented by the aforesaid elastic deflection.

It will also be observed from the schematic representation of FIGURE 1 that the stress or load, both axial and torque, rises to a maximum from essentially zero at the positions of a few of the threads at the extreme right-hand end of the threaded portion of the bolt adjacent the head. The reduced axial load on the first thread is the result of rotational springback which occurs with any bolt as the wrenching force is removed.

In the representation of FIGURE 2, a bolt 10a which is constructed in accordance with the present invention, is threaded into the nut 12. Now, it is the extreme left-hand threads which bear the load with the nut, and the illustrated taper of the pitch line of the bolt can be adjusted, so that the stress can be distributed over essentially all the threads of the bolt.

The illustrated relationship in FIGURE 2 occurs since the last thread "$(n)$" must deflect to load the next-to-last "$(n-1)$" thread. As the bolt is tightened, more threads become active, always progressing from left to right in the figure. Although the earlier-loaded thread flanks slip as the bolt is turned, the load carried by these threads remains constant. The stress or load on the threads is shown by the curve in FIGURE 2.

In the schematic fragmentary representation of FIGURE 3, which illustrates the relationships between a bolt constructed with a tapered thread in accordance with the present invention, and a usual nut, the solid lines designate the bolt profile as stressed, whereas the dotted lines represent the bolt profile unloaded.

The various symbols shown in FIGURE 3 may be defined as follows:

$R = 1/n$ = inches per thread
$\alpha$ = angle between pitch cones, radians or inches/inch or reverse taper angle of bolt when nut thread is straight
$\beta$ = angle of faying flank to common axis
$\epsilon$ = elongation (elastic) in one thread-length when the bolt is tightened
$S$ = stress in bolt if nut is rigid (or stress differential) lb./in.$^2$
$S_B$ = allowable bearing stress on thread flank without galling lb./in.$^2$
$E$ = modulus of elasticity lb./in.$^2$ The equations describing the relationships among the variables designated in FIGURE 3, to obtain the special qualities of the particular thread of the present invention are as follows:

For screw joints employing controlled elastic strain for mechanical reasons; the exact value of the pitch-cone half-angle is given by the binominal expansion:

$$\alpha = \frac{S}{E} \tan \beta - \frac{1}{2}\left(\frac{S}{E}\right)^2 (\tan \beta)^3 + \frac{1}{2}\left(\frac{S}{E}\right)^3 (\tan \beta)^5 \ldots$$

of which only the first term is significant since $S/E$ is very small for currently-used fastener materials.

When $\beta$ equals 60°

$$\alpha \text{ equals } 1.732 \frac{S}{E}$$

For steel: $E = 3 \times 10^7$ and, therefore, $\alpha = .0058$ inch per inch for $10^5$ p.s.i. tensile stress, about ⅓ degree taper.

For screw threaded joints in which flank bearing stress is to be controlled, for example, in order to avoid galling in the unlubricatable type of fastener assemblies, the axial tensile stress must ordinarily be increased. Reducing the cross-section exposed to tension is the most convenient means by which this may be achieved. The desired value of tensile stress is:

$$S = \frac{S_b \times \text{developed bearing area of one thread}}{\text{effective area exposed to tension}}$$

As noted above, the pitch line taper of the present invention may be applied either to the bolt or to the nut. When it is the bolt which is tapered, the large end enters the nut first, as shown in FIGURE 2. The large end, that is the first thread of the bolt, is of usual diameter, and each succeeding thread along the shank of the bolt becomes progressively smaller.

When it is the nut which is tapered, the large end, which is of conventional proportions, is entered first, and each succeeding thread along the nut becomes progressively smaller.

The primary usefulness of the concept of the present invention lies in distributing the load over more threads of the bolt, and over threads more distant from the head of the bolt than in conventional practice. The distribution of the load over more of the bolt threads increases the precision with which the stress in the bolt can be predicted, and this enables higher stresses to be used with the same margin of safety as in the prior art bolts.

The distribution of the load over the threads more distant from the screw head than with the conventional bolt makes the assembly more elastic so that it will withstand more vibrations or thermal cycling without danger of loosening in the assembly even without a lock washer.

A secondary usefulness in the assembly of the invention lies in the fact that the bearing stress or force between the threads of the bolt and nut can be controlled. Improved prediction and control of bearing stress is required in numerous special applications to achieve, for example, reduced galling and improved axial positioning.

While the invention has been illustrated as applied to a bolt, for the reasons described, the same concepts can be applied to the nut.

What is claimed is:

1. In combination, an elongated externally threaded male bolt member having a head and a shank, and an internally threaded female member for receiving said bolt member in a mutually threaded relationship and tending to apply a tensile load to the threads at one end of the combination, one of said members having a helical thread extending therealong with its load bearing flank disposed at an angle $\beta$ with respect to the longitudinal axis thereof, and with the pitch line of said thread being inclined to said longitudinal axis and said pitch line sweeping a cone disposed such that the load on said last-named threaded member is applied in a direction away from the base of said cone and towards the apex thereof, the apex of said cone being adjacent the aforesaid loaded end of the combination and each of the threads of said last-named threaded member exhibiting a progressively decreasing diameter as a function of its distance from the other end of the combination so as to increase the clearance between the loaded flanks of said last-named threaded member and the mating threads of the other of said member, so that the other of said threaded members may have a straight threaded type, the pitch cone half-angle being selected essentially by the binomial expression $$\left(\frac{S}{E}\right) \tan \beta - \frac{1}{2}\left(\frac{S}{E}\right)^2 (\tan \beta)^3 + \frac{1}{2}\left(\frac{S}{E}\right)^3 (\tan \beta)^5 \ldots$$

where S is the stress of the weaker of the two threaded members and E is the modulus of elasticity of the material forming the weaker of the two threaded members.

2. The combination defined in claim 1, in which the aforesaid last-named threaded member is said externally threaded male bolt member, and said helical thread extends around the external tapered conical surface of the shank of said bolt member.

3. The combination defined in claim 2, in which said bolt member has an external tapered conical surface exhibiting a progressively increasing diameter as a function of its distance from said head.

References Cited

UNITED STATES PATENTS

| 597,000 | 1/1898 | Higbee | 285—333 |
|---|---|---|---|
| 855,946 | 6/1907 | Halgren. | |
| 1,064,934 | 6/1913 | Ryan | 151—22 |
| 2,042,467 | 6/1936 | Hothersall | 151—22 |
| 2,272,552 | 2/1942 | Field | 151—22 |
| 2,437,843 | 3/1948 | Van Ness | 285—333 |
| 3,079,968 | 3/1963 | Buckley | 85—47 |
| 3,266,363 | 8/1966 | Bronson et al. | |
| 3,351,115 | 11/1967 | Boehlow | 151—22 |
| 3,381,733 | 5/1968 | Stanwick | 151—22 |

FOREIGN PATENTS

| 1,333,181 | 6/1963 | France. |
|---|---|---|
| 1,358,625 | 3/1964 | France. |
| 857,495 | 12/1960 | Great Britain. |

MARION PARSONS, Jr., Primary Examiner

U.S. Cl. X.R.

85—32, 46